United States Patent [19]
Müller et al.

[11] 3,900,607

[45] Aug. 19, 1975

[54] POLYLAUROLACTAM POWDERS SUITABLE FOR METAL COATING

[75] Inventors: Karl-Adolf Müller; Armin Gude; Gerhard Menzel, all of Marl, Germany

[73] Assignee: Chemische Werke Huels Aktiengesellschaft, Marl, Germany

[22] Filed: Jan. 14, 1974

[21] Appl. No.: 432,873

Related U.S. Application Data

[63] Continuation of Ser. No. 364,430, May 29, 1973, abandoned, which is a continuation of Ser. No. 257,977, May 30, 1972, abandoned, which is a continuation of Ser. No. 695,353, Jan. 3, 1968, abandoned.

[30] Foreign Application Priority Data

Jan. 9, 1967  Germany.................................. 41216

[52] U.S. Cl........ 427/185; 260/30.6 R; 260/31.2 N; 260/32.6 N; 260/32.8 N; 260/33.4 R; 260/33.4 P; 260/34.2; 260/78 L; 260/78 S
[51] Int. Cl.......................... B44d 1/36; C08g 20/10
[58] Field of Search..... 260/30.6 R, 31.2 N, 32.6 N, 260/34.2, 78 L, 78 S, 32.8 N, 33.4 R, 33.4 P; 117/DIG. 6, 132 C, 16

[56] References Cited

UNITED STATES PATENTS

| | | | |
|---|---|---|---|
| 2,374,069 | 4/1945 | Balthis | 260/78 S |
| 2,396,715 | 3/1946 | McGrew | 260/32.2 |
| 3,325,455 | 6/1967 | Warner | 260/78 L |
| 3,368,992 | 2/1968 | Altermatt | 260/32.6 N |

FOREIGN PATENTS OR APPLICATIONS

1,164,077  8/1964  Germany

OTHER PUBLICATIONS

Modern Plastics Encyclopedia 1967, (McGraw-Hill), (N.Y.), (Sept. 1966), pp. 204–206, TP986.A2.M5.

*Primary Examiner*—Donald E. Czaja
*Assistant Examiner*—H. H. Fletcher
*Attorney, Agent, or Firm*—Millen, Raptes & White

[57] ABSTRACT

Plasticizing polylaurolactam in solution and then precipitating results in a powdery product of improved estensibility, and which is particularly amenable for the coating of metals by the fluidized bed process.

10 Claims, No Drawings

POLYLAUROLACTAM POWDERS SUITABLE FOR METAL COATING

This is a continuation, of application Ser. No. 364,430, filed May 29, 1973, now abandoned said Ser. No. 364,430 being a continuation of Ser. No. 257,977, filed 5/30/72, said Ser. No. 257,977, being a continuation of Ser. No. 695,353, filed 1/3/68 all of said applications being abandoned.

BACKGROUND OF THE INVENTION

This invention relates to plasticized polylaurolactam powder particularly suitable for coating metals at high temperatures.

It is known that polyamide powders, used for the production of varnish-like coatings on metals, are applied by the fluidized bed, flame spraying, or electrostatic coating processes. The polyamide powders themselves are obtained by precipitating polyamide from solutions (published West German application S 2805 39 b 22/04) or by grinding polyamide granules. In a similar manner, polylaurolactam powders can also be applied and obtained. However, due to low tensile strength, polylaurolactam coatings prepared in this manner readily tear apart at places subjected to particular stress during subsequent shaping of coated metal parts, e.g. by bending, deep drawing or compression.

Although compounds containing hydroxyl groups are suitable as plasticizers for polyamides (German Pat. Nos. 897,476; 896,265; and 905,884) and mechanical properties of foils produced from solutions or melts of polyamides are improved by the addition of small amounts (up to about 5 percent by weight) of such hydroxyl-group containing compounds (published text of German Patent Application P 1099 39 b 22/04), such plasticizers have not heretofore been added to polyamide powders intended for use in the coating of metals at high temperatures. The reason for this is because the decomposition point of the plasticizers is below the processing temperature of the polyamide powder. It was expected that, even though the processing temperatures are applied for only a short period of time, decomposition of the plasticizers would occur.

Phosphorous acid esters have also been suggested as plasticizers for polyamides, but since individual esters have materially different plasticizing effects, it has been necessary to select specific types of these esters for different purposes (German Patent No. 1,164,077).

SUMMARY OF THE INVENTION

An object of this invention, therefore, is to provide improved coating compositions of polylaurolactam, so that they will be suitable for coating metals at high temperatures.

Another object is to provide a new process of plasticizing polylaurolactam.

Still another object is to provide articles of manufacture coated with the plasticized compositions of this ivention.

Upon further study of the specification and claims, other objects and advantages of the present invention will become apparent.

These objects are attained by dissolving 0.1–5, preferably 1–3 percent by weight of such phosphorous acid esters or hydroxyl-containing compounds based on the weight of polylaurolactam in a solvent solution of the polylaurolactam and subsequently precipitating the plasticizer-containing polylaurolactam by cooling the resulting solution in a conventional manner.

DETAILED DISCUSSION OF THE INVENTION

Suitable hydroxyl-group containing plasticizers include, but are not limited to phenols of the formula

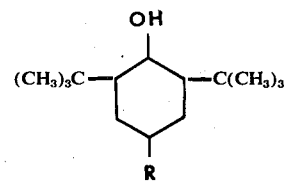

I wherein R represents a saturated alkyl residue of from 1 to 8 carbon atoms, e.g. ethyl, propyl, amyl, hexyl and heptyl, as well as the branched isomers thereof.

Exemplary of such phenols of Formula I are, among others: 2,6-di-tert.-butyl-4-methyl-phenol; 2,6-di-tert.-butyl-4-butyl-phenol; 2,6-di-tert.-butyl-4-hexyl-phenol; and 2.6-di-tert.-butyl-4-octyl-phenol.

Additional suitable compounds include, but are not limited to hydroxyphenyl carboxylic acid esters of the formula:

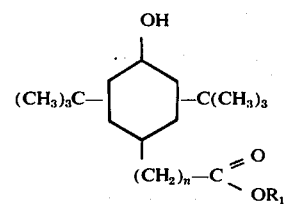

II wherein
  $n$ represents 0 to 6; and
  $R_1$ represents a saturated alkyl residue of from 1 to 18 carbon atoms, e.g. ethyl, propyl, octyl and dodecyl, as well as the branched isomers thereof.

Exemplary compounds of Formula II include, among others: the octadecyl ester of 3,5-di-tert.-butyl-4-hydroxyphenylpropionic acid; the decyl ester of 3,5-di-tert.-butyl-4-hydroxyphenylpropionic acid and the methyl or butyl ester of 3,5-di-tert.-butyl-4-hydroxyphenylpropionic acid. are lighter Also useful plasticizers are phosphorous acid esters such as, for example, the trialkyl, triphenyl, or trialkylphenyl esters, as well as mixed esters thereof. Examples of same include, but are not limited to: the trinonylphenyl ester, the diphenyldecyl ester, the didecylphenyl ester, the diphenylisooctyl ester, the triisodecyl ester and the bisnonylphenyl ester. Generally, each alkyl- or alkylphenyl is of 6 to 20, preferably 10 to 15 carbon atoms.

The phosphorous acid esters and the compounds containing hydroxyl groups are alternatively employed in mixtures with each other. In such a case, the mixture ratio is generally from 10 to 90 percent of phosphorous acid ester to 90 to 10 percent of the hydroxyl-group containing compound, particularly from 40 to 60 percent. It is of interest to note that coatings produced with phosphorous acid esters or mixtures thereof ar elighter than those with compounds containing hydroxyl groups.

Formic acid and dimethyl formamide are useful particularly as solvents for the polylaurolactam. Additional illustrative solvents preferred include, but are not limited to: higher alkanols of preferably 6 to 8 carbon atoms, such as 2-ethyl butanol and n-hexanol; or cyclic ketones of preferably about 6 carbon atoms, such as cyclohexanone. The solvent is in no way limited to the aforenamed; other known and available solvents for polylaurolactam can likewise be employed.

With respect to the quantity of solvent used per 100 parts by weight polylaurolactam, it is sufficient if enough is employed so that the polymer and plasticizer are dissolved: Generally speaking, however, by weight, it is preferred to use about 50 to 90 parts solvent.

The preferred polylaurolactam having the following properties is made in known manner in a two stage process wherein the first stage is carried out at 200° to 350°C especially in the presence of water and catalysts as e.i. phosphoric acid, adipic acid, sulfuric acid and in the second stage is polymerized at a temperature between 270° to 350°C. The polylaurolactam used has a reduced specific viscosity of from 1.0 to 1.4 (in m-cresol at 25°).

The powdery polylaurolactam of this invention is produced by dissolving polylaurolactam in a solvent therefor at about 100° to 180°C., preferably 130° to 160°C., and adding the plasticizer to the thus-obtained solution in an amount as set forth above. The polylaurolactam is thereafter obtained from said solution in a conventional manner by cooling. The rate of cooling is especially 0.1 to 10°C per second.

The resulting powdery polylaurolactam contains plasticizer and is thus identified as solvent-precipitated plasticized polylaurolactam.

The process eliminates the need for selecting specific plasticizers in order to arrive at the desired result. As demonstrated by the comparative experiments set out below, coatings having good extensibility (deep draw characteristics) are obtained only when plasticizer is added to the polyamide in solution. When the same plasticizer is incorporated in the polylaurolactam in an extruder, i.e. in the melt, and the thus-obtained mixture is subsequently ground, the coatings produced therefrom do not exhibit sufficient extensibility.

A measure of the extensibility of a coating, particularly at a high deformation velocity is provided by testing in the Erichsen cupping test device. In accordance with this test, a coated metal sheet is deep-drawn by a hemispherical die under the impact of a falling hammer, the weight of the falling hammer being variable.

The maximum depth of the metal sheet in mm. is determined at which the polylaurolactam coating remains undamaged. The substrates most benefitted by the high temperature coating The polylaurolactams of this invention include, but are not limited to, aluminum, steel. All other metals or alloys, such as iron, copper, zinc can be coated to inhibit corrosion.

Whereas the polylaurolactam of this invention can be utilized in any coating method, it is particularly amenable to high temperature processes such as fluidized bed processes wherein operating temperatures are generally about 200° to 400°C.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

2.5 g. (0.5% by weight) of 3,5di-tert.-butyl-4-hydroxyphenylpropionic acid octadecyl ester are dissolved in a solution of 500 g. of granulated polylaurolactam in 2,000 g. of boiling dimethyl formamide. The thus-obtained solution is allowed to cool under stirring. The resultant polylaurolactam powder, after precipitation, is suction filtered and dried under vacuum.

An aluminum or iron sheet having a thickness of 1 mm is coated in a fluidized bed. Specifically, the sheet, heated to 380°C., is then immersed for 3 seconds in the fluidized polylaurolactam powder. The coated metal sheet is then allowed to air-cool.

The thickness of the coating is about 300 $\mu$; the Erichsen impact cupping test value of the thus-obtained coating is 2.1 mm.

A coating produced in the same manner, but containing 1, 2 or 5 percent by weight, instead of 0.5 percent by weight of 3,5-ditert.-butyl-4-hydroxyphenylpropionic acid octadecyl ester has an Erichsen impact cupping test value of 6.3 mm.

EXAMPLE 2

According to the method of Example 1, 2 percent by weight of tri-(isononylphenyl)-phosphite are incorporated into polylaurolactam powder. A coating is applied to iron sheets in accordance with the procedure described in Example 1.

The resultant Erichsen impact cupping test value of this coating is 6.0 mm.

In the following table, the results of the examples are set forth. In addition, two comparative examples are tabulated wherein the plasticizer used was octadecyl ester of 3,5-di-tert.-butyl-4-hydroxyphenylpropionic acid and tri-(isononylphenyl)-phosphite.

| Type of Plasticizer | Quantity in % by weight | Erichman Respect Cupping Test (mm) |
|---|---|---|
| Examples: | | |
| Octadecyl ester of 3,5-di-tert-butyl-hydroxyphenyl-propionic acid | 0.5 | 2.1 |
| | 1.0 | 6.3 |
| | 2.0 | 6.3 |
| | 5.0 | 6.3 |
| Tri-(isononylphenyl)-phosphite | 2.0 | 6.0 |
| Comparative Examples: | | |
| a) without plasticizer | -- | 0.3 |
| b) plasticizer admixed in an extruder and subsequent grinding of the mixture | 1.0 | 3.3 |

In the preceding examples, the polylaurolactam used had a reduced specific viscosity of 1.2 (in m-cresol at 25°C).

The preceding examples can be repeated with similar success by substituting the generically and specifically described reactants and operating conditions of this invention for those used in the preceding examples.

From the foregoing description, one skilled in the art can easily ascertain the essential characteristics of this invention and without departing from the spirit and scope thereof, can make various changes and modifications of the invention to adapt it to various usages and conditions. Consequently, such changes and modifications are properly, equitably and intended to be, within the full range of equivalence of the following claims.

What is claimed is:

1. In a process of coating a metal substrate with plasticized polylaurolactam powder by the fluidized bed coating process, the improvement comprising employing as said polylaurolactam powder a precipitate recovered from a solution comprising polylaurolactam, a solvent therefor and a plasticizer therefor present in the solution in a concentration of 0.5–3 percent by weight based on the weight of the polylaurolactam, said solvent being present in sufficient quantities to dissolve said polylaurolactam and said plasticizer, and being a member selected from the group consisting of formic acid, dimethylformamide, 2-ethylhexanol, n-hexanol and cyclohexanone, said plasticizer being at least one member selected from the group consisting of a) a phenol of the formula:

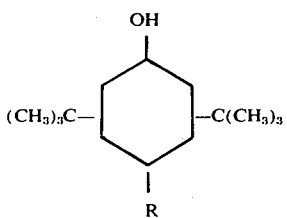

wherein

R is alkyl having from 1 to 18 carbon atoms; b) a hydroxyphenyl carboxylic acid ester of the formula:

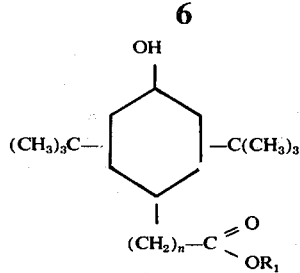

wherein $n$ is O or a positive whole number from 1 to 6 inclusive, and $R_1$ is alkyl having from 1 to 18 carbon atoms; and c) a phosphorous acid ester selected from the group consisting of a trialkyl ester, triphenylester, tri-(alkylphenyl)-ester, a phenyldialkylester and an alkyl diphenyl ester, each alkyl having from 1 to 18 carbon atoms, inclusive, said precipitate having been dried and provided in the particle size required for the fluidized bed coating process.

2. A process as defined by claim 1, said solution containing on a weight basis 50–90 parts solvent per 100 parts polylaurolactam.

3. A process as defined by claim 1, said precipitate being formed by the steps of:

a. dissolving said polylaurolactam in said solvent at above ambient temperature;

b. adding said plasticizer to resultant solution of solvent and polylaurolactam; and c. cooling resultant solution containing said plasticizer to precipitate said plasticized polylaurolactam.

4. A process as defined by claim 3, wherein the polylaurolactam is dissolved at 100°–180°C., and said cooling is conducted at a rate of 0.1°–10°C. per second.

5. A process as defined by claim 4, wherein the polylaurolactam is dissolved at 130°–160°C.

6. A process as defined by claim 1 wherein the fluidized bed coating process is conducted at 200°–400°C.

7. A process as defined by claim 2 wherein the fluidized bed coating process is conducted at 200°–400°C.

8. A process as defined by claim 3 wherein the fluidized bed coating process is conducted at 200°–400°C.

9. A process as defined by claim 4 wherein the fluidized bed coating process is conducted at 200°–400°C.

10. A process as defined by claim 5 wherein the fluidized bed coating process is conducted at 200°–400°C.

* * * * *